United States Patent [19]

Shimada et al.

[11] Patent Number: 4,760,251

[45] Date of Patent: Jul. 26, 1988

[54] OPTICAL SCANNING APPARATUS WHEREIN IMAGE SCANNING CLOCK SIGNAL FREQUENCY IS CORRECTED TO RENDER SCANNING SPEED CONSTANT

[75] Inventors: Kazuyuki Shimada, Tokyo; Susumu Imakawa, Kanagawa, both of Japan

[73] Assignee: Ricoh Company, Ltd., Tokyo, Japan

[21] Appl. No.: 889,887

[22] Filed: Jul. 24, 1986

[30] Foreign Application Priority Data

| Jul. 31, 1985 | [JP] | Japan | 60-169342 |
| Jul. 31, 1985 | [JP] | Japan | 60-169343 |
| Aug. 5, 1985 | [JP] | Japan | 60-172157 |

[51] Int. Cl.$^4$ ............................................. H01J 3/14
[52] U.S. Cl. ......................................... 250/235; 358/293
[58] Field of Search ............... 250/235, 236; 358/280, 358/285, 288, 293, 294

[56] References Cited

U.S. PATENT DOCUMENTS

| 4,159,488 | 6/1979 | Tanaka et al. | 358/293 |
| 4,321,629 | 3/1982 | Ogasawara | 358/294 |
| 4,349,847 | 9/1982 | Traino | 358/293 |
| 4,369,365 | 1/1983 | Bedford et al. | 250/236 |
| 4,441,126 | 4/1984 | Greenig et al. | 358/293 |
| 4,586,057 | 4/1986 | Schoon | 358/293 |
| 4,639,789 | 1/1987 | Curry | 258/285 |
| 4,667,099 | 5/1987 | Arai et al. | 250/235 |

Primary Examiner—David C. Nelms
Assistant Examiner—William L. Oen
Attorney, Agent, or Firm—Cooper & Dunham

[57] ABSTRACT

The speed at which a desired surface is scanned by a light beam is rendered constant by correcting the frequency of an image scanning clock signal without using an f lens. The characteristics of correcting the image scanning clock frequency can be varied, or the image scanning clock signal can be brought into phase with a recording position signal.

13 Claims, 10 Drawing Sheets

F I G. 1
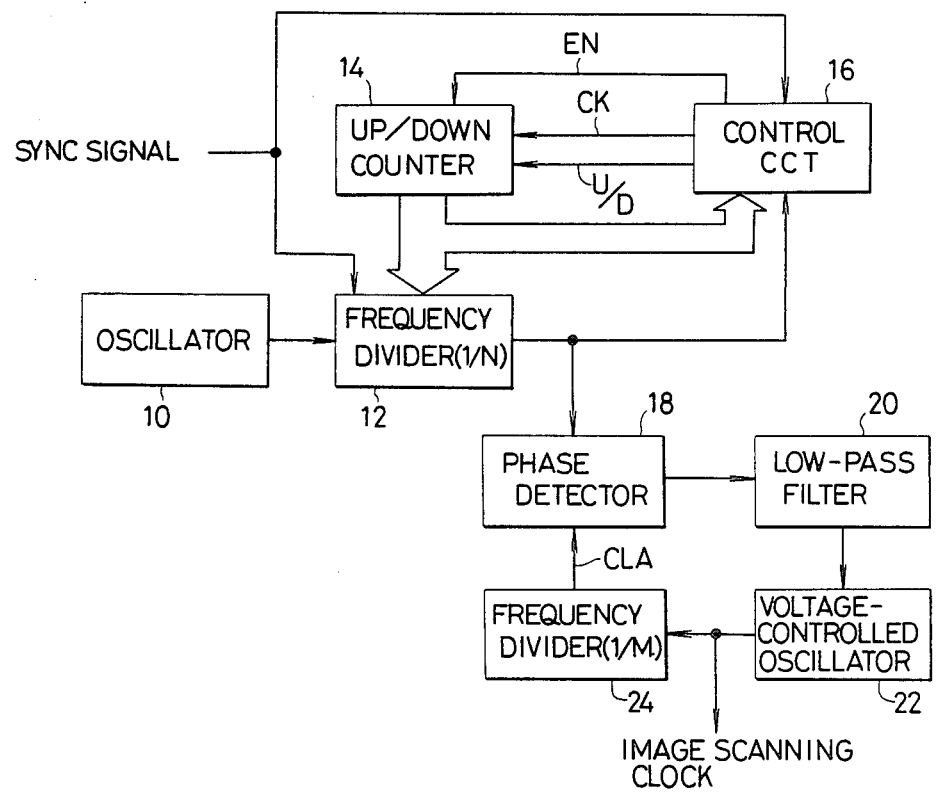

F I G. 4
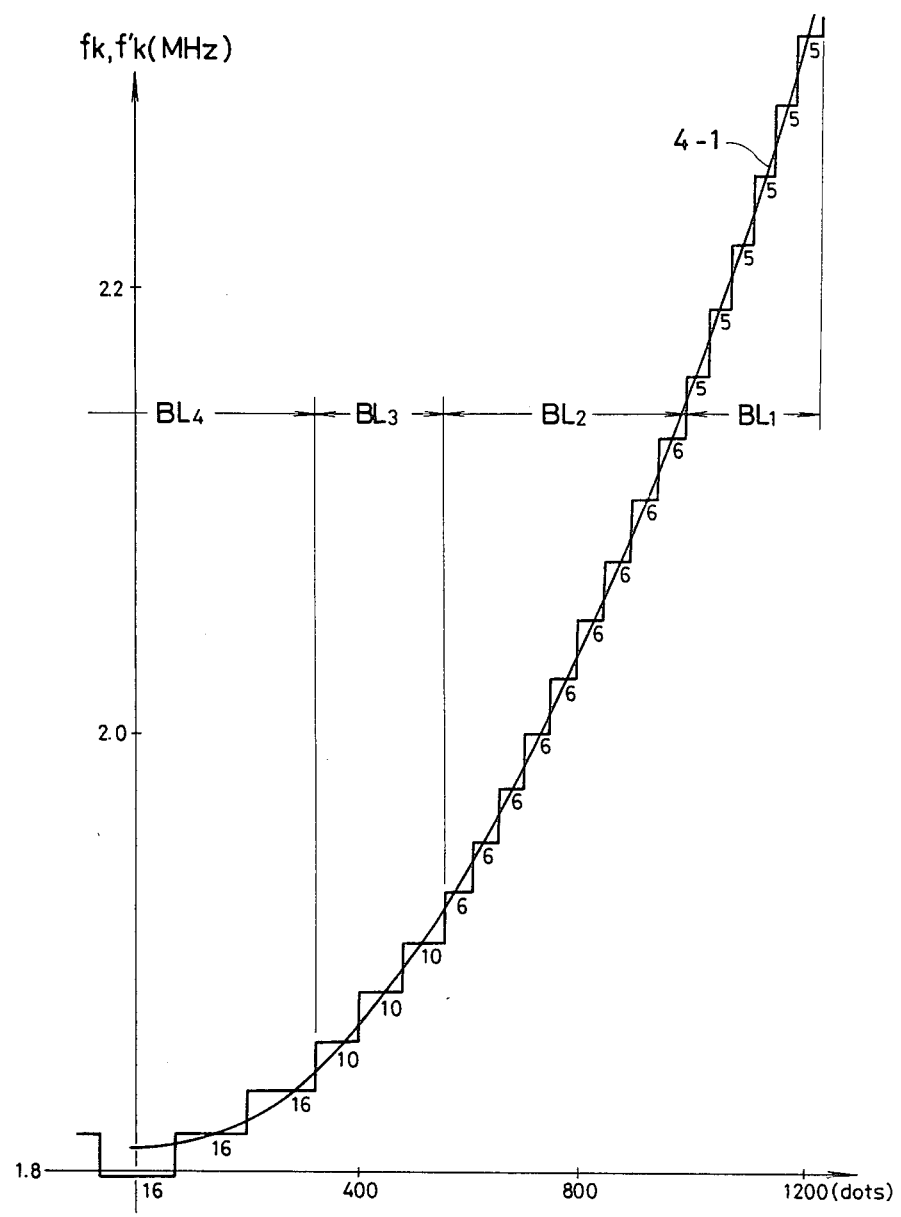

F I G. 9
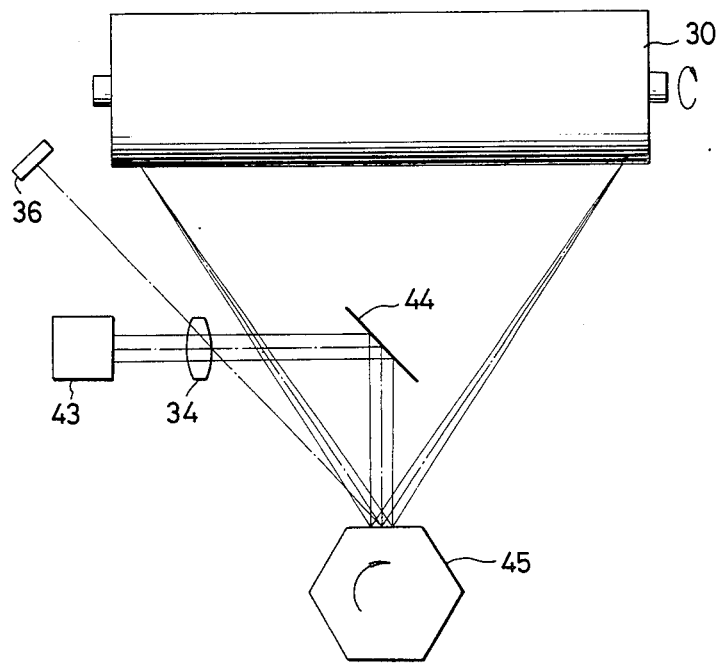
F I G. 13
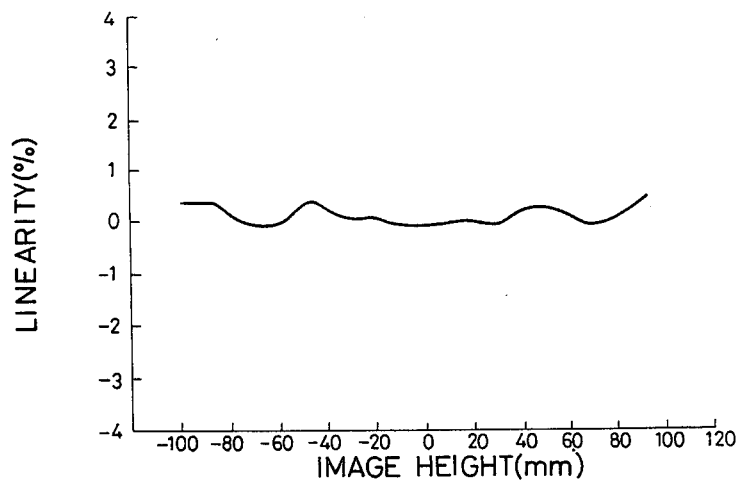

F I G. 14
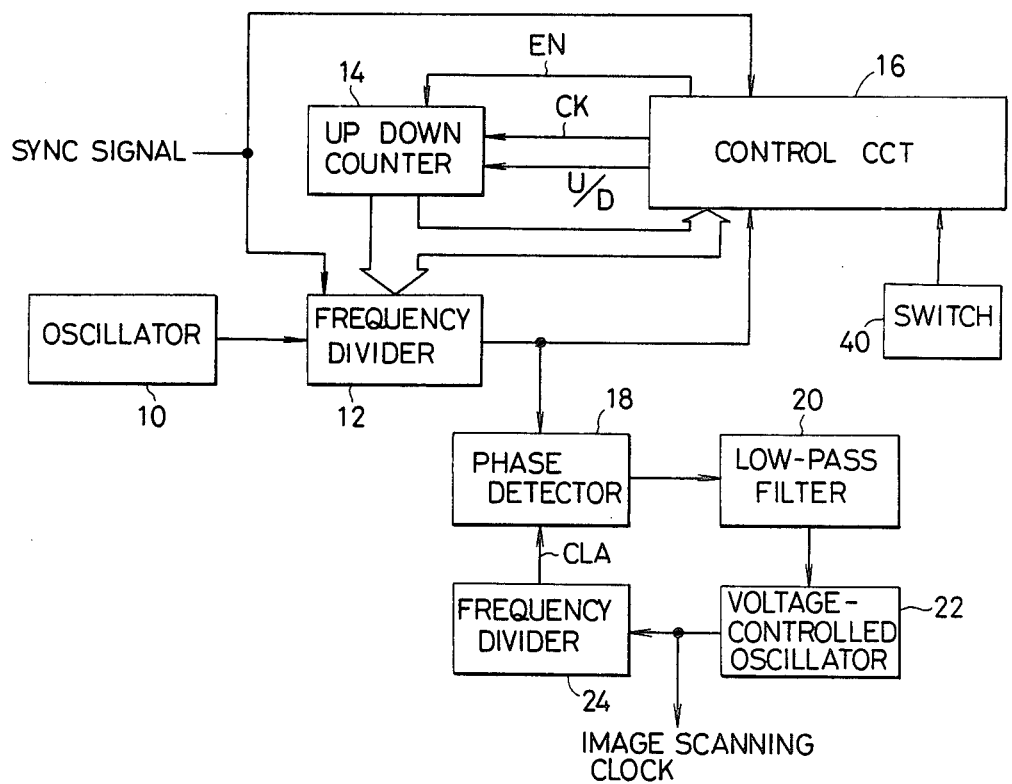

F I G. 15
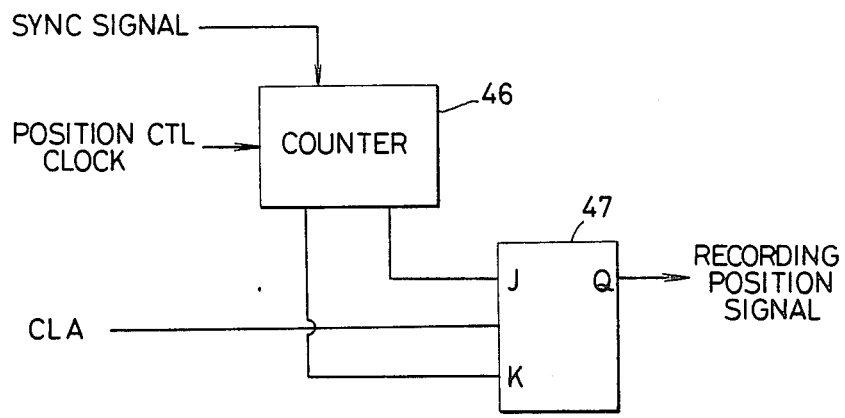
F I G. 16
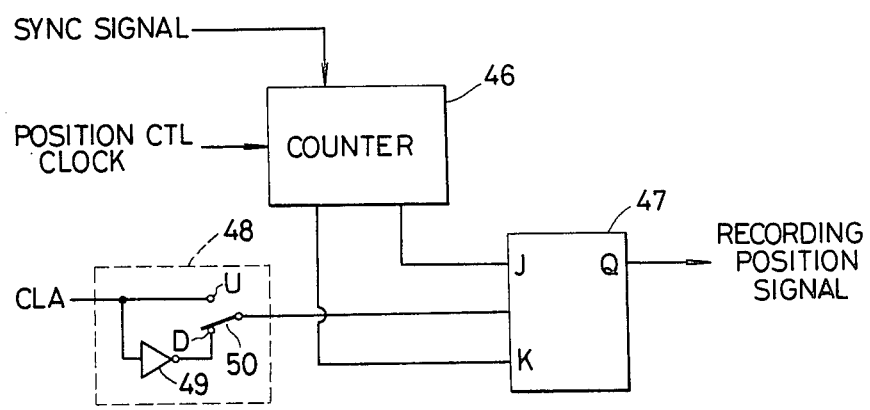

OPTICAL SCANNING APPARATUS WHEREIN IMAGE SCANNING CLOCK SIGNAL FREQUENCY IS CORRECTED TO RENDER SCANNING SPEED CONSTANT

BACKGROUND OF THE INVENTION

1. Field of the Invention

The present invention relates to an optical scanning apparatus for use in a laser printer, a laser facsimile receiver, etc..

2. Description of the Prior Art

Optical scanning apparatus are used for scanning a desired surface with a light beam to write information on the surface. In such optical scanning apparatus, the light beam is deflected at a constant angular velocity by means of a rotating light deflector such as a polygonal mirror or a hologram scanner. To make the scanning speed constant on the surface being scanned, an $f\theta$ lens is generally employed in the optical scanning apparatus. Since the $f\theta$ lens is expensive, however, there has been a demand for an optical scanning system which has no such $f\theta$ lens. There has recently been proposed a polygonal mirror which does not scan a light beam at a constant angular velocity (see Japanese Patent Application No. 59(1984)-274324). No $f\theta$ lens can be used with such a proposed polygonal mirror since any $f\theta$ lens would fail to make the scanning speed constant.

An image scanning clock signal is employed to turn on and off a scanning light beam when a desired surface is scanned therewith. The image scanning clock signal has a frequency fk expressed by 1/T where T is a time period assigned for writing information corresponding to one pixel. Where no $f\theta$ lens is employed, the speed at which a surface is scanned with a scanning light beam is not constant. Therefore, if the frequency fk of an image scanning clock signal were constant, the information written by the scanning light beam would be distorted.

FIG. 3 of the accompanying drawings illustrates an optical system in an optical scanning apparatus. A light beam L is deflected at a constant angular velocity by a rotating polygonal mirror 32, and converged by a condenser lens 34 onto the surface of a photoconductive photosensitive body 30. The light beam L is generally a laser beam emitted from a gas laser or a semiconductor laser. Distances l, h as defined in FIG. 3 are related as follows:

$$h = l \cdot \tan\theta$$

Assuming that the angular velocity of the polygonal mirror is expressed by $\omega_0$ (constant), since the angular velocity of the scanning light beam is given by $d\theta/dt = 2\omega_0 = \omega$ (constant), the scanning speed is expressed as follows;

$$\frac{dh}{dt} = l \cdot \omega \cdot \frac{1}{\cos^2\theta} = l \cdot \omega \cdot \left(1 + \frac{h^2}{l^2}\right)$$

If the length of a scanned area is 2H and $H + h = h'$, then $$\frac{dh}{dt} = l \cdot \omega \cdot \left(1 + \frac{(h' - H)^2}{l^2}\right)$$

Assuming that there are $2n_o$ pixels within the scanning area length 2H, the scanning speed Vn at the nth pixel as counted from the lefthand scanning starting edge of the scanning area is given by:

$$Vn = l\omega \left(1 + \frac{(nd - n_0 d)^2}{l^2}\right)$$

where d is the width of one pixel. Inasmuch as the frequency fk of the image scanning clock signal is Vn/d, $$fk(n) = \frac{l\omega}{d} \left(1 + \frac{(nd - n_0 d)^2}{l^2}\right) \quad (1)$$

Therefore, by varying the image scanning clock frequency fk for each pixel according to the equation (1), the desired surface can be optically scanned without distorting written information even if no $f\theta$ lens is employed. The timing or period of varying the image scanning clock frequency is derived from a count value produced by starting to count the clock signal upon generation of a synchronizing signal from a light sensor 36 placed on the scanned surface or in a position equivalent to the scanned surface.

A generator for generating the image scanning clock signal comprises an oscillator, a first frequency divider, an up/down (U/D) counter, a control circuit, and a phase-locked loop (PLL) circuit. The oscillator generates a reference clock signal having a constant frequency $F_0$. The first frequency divider frequency-divides the reference clock signal to produce a position control clock signal. The U/D counter changes the frequency-dividing ratio N of the first frequency divider (where N is a natural number).

The control circuit operates as follows: The scanning area is divided into K blocks BLi (i=1 through K). The U/D counter is driven at every Mi pulses (i=1 through K) of the position control clock signal for the ith block BLi, so that the frequency-dividing ratio N is successively changed throughout the entire scanning area based on the prescribed finite sequence Mi (i=1 through K). More specifically, if the frequency-dividing ratio N has an initial value $N_0$, then the frequency of the position control clock signal is initially $f_0/N_0$. When M1 pulses of the position control clock signal are counted in the first block BL1, the control circuit enables the U/D counter to change the frequency-dividing ratio $N_0$ of the first frequency divider to $N_1$ ($N_0 + \Delta N$), so that the frequency of the position control clock signal becomes $f_0/N_1$. When M1 pulses of the clock signal having such a new frequency are counted, the frequency-dividing ratio $N_1$ is changed to $N_2$. The above cycle is repeated n1 times. In the second block BL2, the cycle of changing the frequency-dividing ratio at every M2 pulses of the position control clock signal is repeated n2 times. Such a process is carried out for each of the blocks. Therefore, in the ith block BLi, the frequency-dividing ratio is changed ni times at every Mi pulses of the position control clock signal.

The PLL circuit is composed of a phase detector, a low-pass filter, a second frequency divider, and a voltage-controlled oscillator, the second frequency divider having a fixed frequency-dividing ratio M. The PLL circuit generates an image scanning clock signal having a frequency which is successively variable with the sequential change of the frequency of the position control clock signal.

The above image scanning clock generator will be described with reference to FIG. 1. The PLL circuit comprises a phase detector 18, a low-pass filter 20, a voltage-controlled oscillator 22, and a second frequency divider 24. A reference clock signal of a frequency $f_0$ generated by an oscillator 10 is frequency-divided by a first frequency divider 12 into a position control clock signal having a frequency of $f_0/N$, which is applied to a control circuit 16 and the phase detector 18.

The phase detector 18 compares the phases of the position control clock signal and a clock signal CLA from the second frequency divider 24, and applies the phase difference as a pulse signal to the low-pass filter 20. When the phase difference information is delivered through the low-pass filter 20 to the voltage-controlled oscillator 22, the oscillator 22 produces a clock signal having a frequency commensurate with the output voltage of the low-pass filter 20. The clock signal generated by the oscillator 22 serves as an image scanning clock singal. The image scanning clock signal is then frequency-divided by the frequency divider 24, which applies the clock signal CLA to the phase detector 18 in which it is compared with the position control clock signal.

The frequency of the clock signal generated by the voltage-controlled oscillator 22 remains unchanged if there is no phase difference between the clock signal CLA and the position control clock signal which are compared in phase by the phase detector 18. This condition is referred to as an equilibrium condition of the PLL circuit. For example, if the frequency of the position control clock signal is $f_0/N$ under the equilibrium condition, then the frequency of the clock signal CLA is also $f_0/N$. Therefore, the frequency fk of the clock signal produced by the voltage-controlled oscillator 22 is expressed by:

$$fk = f_0 \cdot (1/N) \cdot M = f_0 \cdot (M/N)$$

When the frequency-dividing ratio of the frequency divider is changed from N to N', the frequency of the position control clock signal becomes $f_0 \cdot (1/N')$, creating a phase difference between the position control clock signal and the clock signal CLA. Accordingly, the frequency fi of the clock signal produced by the voltage-controlled oscillator 22 is also changed successively at a constant rate from $f_0 \cdot (M/N)$ to $f_0 \cdot (M/N')$. Therefore, by varying the frequency/dividing ratio N of the frequency divider 12, the frequency fk of the image scanning clock signal can be successively changed.

The control circuit 16 produces a clock signal CK for enabling a U/D counter 14 to produce preset varies for frequency-dividing ratios of the frequency divider 12, a signal EN for enabling the U/D counter 14 to count the clock signal CK, and a mode signal U/D for selecting an up-count or down-count mode.

The mode signal U/D is generated so that the U/D counter 14 changes from the up-count mode (or down-count mode) to the down-count mode (or up-count mode) in the vicinity of an extreme value of the scanning speed.

When the clock signal CK is applied to the U/D counter 14, it updates the preset value to change the frequency-dividing ratios of the frequency divider 12.

The clock signal CK is generated for each block BLi (i=1 through K) based on the finite sequence Mi (i=1 through K), as described above. Thus, Mi and ni are preset for each block. In the ith block BLi, the clock signal CK is generated from the control circuit 16 each time Mi pulses of the position control clock signal are supplied, and hence the clock signal CK is generated ni times in the block Bli.

The block number K and the values of Mi, ni are selected so that the frequency fk of the image scanning clock signal generated by the voltage-controlled oscillator 22 will vary according to the variation of the scanning speed, e.g., will well approximate the equation (1), for example. The block number K and the values of Mi, ni are determined experimentally or theoretically according to design conditions.

FIG. 4 shows, by way of example, an ideal pattern in which the image scanning clock frequency fk varies (curve 4-1) and a step-like pattern in which a clock frequency f'k varies by changing the frequency-dividing ratio. The numerals 5, 6, 10, 16 below the frequency-changing steps correspond to M1, M2, M3, M4 with the righthand end of the graph being a scanning starting end. It will be noted that n1=6, n2=9, n3=3, n4=5. The graph only shows a righthand half of a symmetric step-like pattern, and M5=10, n5=3, M6=6, n6=9, M7=5, n7=6. FIG. 4 indicates that the block BLi is a region in which the continuous curve of the frequency fk approximates a straight line, and the horizontal widths of the steps in each block are equal to each other. The clock frequency f'k corresponds to M times the position control clock frequency. Although the clock frequency f'k itself varies in a step-like manner, the frequency of the actual image scanning clock signal is continuously changed by the PLL circuit to well approximate the curve 4-1.

FIG. 2 is a timing chart explanatory of operation of the circuit shown in FIG. 1. Since the up-count and down-count modes of the U/D counter 14 are changed in the vicinity of an extreme value of the scanning speed, the frequency-dividing ratio N and the frequencies $f_0/N$, fk are symmetric with respect to a position in the vicinity of such an extreme value.

The synchronizing signal is generated from the light sensor 36 shown in FIG. 3 to initialize the first frequency divider 12. The synchronizing signal is also applied to the control circuit 16.

The signal EN energizes the counter upon elapse of a preset time Ta after the synchronizing signal has been received, and de-energizes the counter upon elapse of a preset time Tb after the desired area or printing zone has been scanned. At the same time the counter is de-energized, the frequency-dividing ration N is fixed to the initial value.

The optical scanning apparatus also has a circuit for generating a signal indicating a recording position. This circuit is initialized by the synchronizing signal from the light sensor 36 to count the position control clock signal from the frequency divider 12, and a generates a recording position signal when the count changes from one value to another value. The recording position signal and the image scanning clock signal are applied to an external device, which issues an image signal in synchronism with the image scanning clock signal when the recording position signal is applied. The image signal is applied to a modulator to modulate the light beam L, e.g., to turn on or off the semiconductor laser which generates the light beam L, for thereby forming a latent image on the photosenstive body 30.

With the optical scanning apparatus described above, however, the synchronizing signal from the light sensor 36 tends to fluctuate because of manufacturing or operating errors of the rotating polygonal mirror or light deflector 32, causing the position control clock singal from the frequency divider 12 and the clock CLS from the frequency divider 24 to go out of phase with each other. Therefore, the image scanning clock signal and the recording position signal are also caused to be brought out of phase with each other, with the result that the image signal may be partly erased, thus lowering the quality of the recorded image.

Furthermore, in the event that the rotating light deflector, the optical axis, or the light sensor suffers a positional error, the characteristic curve for the correction of the frequency of the image scanning clock signal and the characteristic curve for the changing of the scanning speed are deviated from each other for thereby impairing linearity and magnification error, and hence the image quality. The term "linearity" used herein indicates, for example, variations in the pitch between straight lines that are recorded by the scanning beam at equal intervals.

SUMMARY OF THE INVENTION

It is an object of the present invention to provide an optical scanning apparatus capable of preventing an image quality reduction which would otherwise result from deviation between the characteristic curve for the correction of the frequency of an image scanning clock signal and the characteristic curve for the changing of a scanning speed.

Another object of the present invention is to provide an optical scanning apparatus capable of improving the quality of a recording image which would otherwise be lowered by deviation between the characteristic curve for the correction of the frequency of an image scanning clock signal and the characteristic curve for the changing of a scanning speed.

According to the present invention, there is provided an optical scanning apparatus including a light source for emitting a light beam, a rotatable light deflector for deflecting the light beam from the light source to scan an area of a photosensitive body therewith, a condenser lens disposed between the light source and the rotatable light deflector for focusing the light beam from the light source as a small light spot on the photosensitive body, a light sensor for detecting the scanning light beam from the rotatable light deflector outside of the area of the photosensitive body, and means for continuously varying the frequency of an image scanning clock signal according to the speed at which the photosensitive body is scanned with the light beam by the rotatable light deflector, upon elapse of a preset time period after a synchronizing signal has been generated by the light sensor, and time varying means for varying the preset time period.

According to the present invention, there is further provided an optical scanning apparatus including a rotatable light deflector for deflecting a light beam to scan an area, an oscillator for generating a reference clock signal, a frequency divider for frequency-dividing the reference clock signal to generate a position control clock signal, means for generating an image scanning clock signal from the position control clock signal, control means for successively changing the frequency-dividing ratio of the frequency divider to vary the frequency of the image scanning clock signal according to the speed at which the area is scanned with the light beam, a light sensor for detecting the scanning light beam from the rotatable light deflector outside of the area, a counter resettable by a synchronizing signal from the light sensor for counting the position control clock signal, and means for generating a recording position signal when the count of the counter is in a preset range.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a block diagram of an image scanning clock generator in an optical scanning apparatus;

FIG. 4 is a graph showing the characteristics of the optical scanning apparatus;

FIG. 9 is a plan view of an optical system in an optical scanning apparatus according to another embodiment of the present invention;

FIGS. 11 through 13 are diagrams explanating linearity of the optical scanning apparatus of FIG. 9;

FIG. 14 is a block diagram of an image scanning clock generator in the optical scanning apparatus of FIG. 9;

FIGS. 15 and 16 are block diagrams of portion of optical scanning apparatus according to other embodiments of the present invention.

DESCRIPTION OF THE PREFERRED EMBODIMENTS

Figure 2:
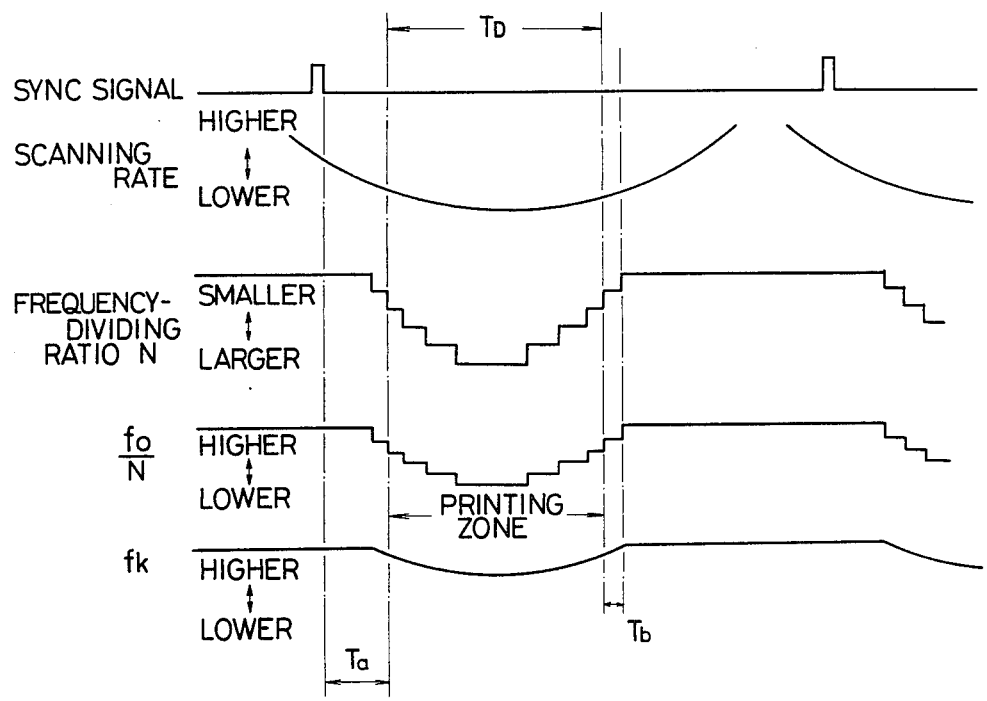
FIG. 2 is a timing chart of operation of the optical scanning apparatus.
Figure 3:
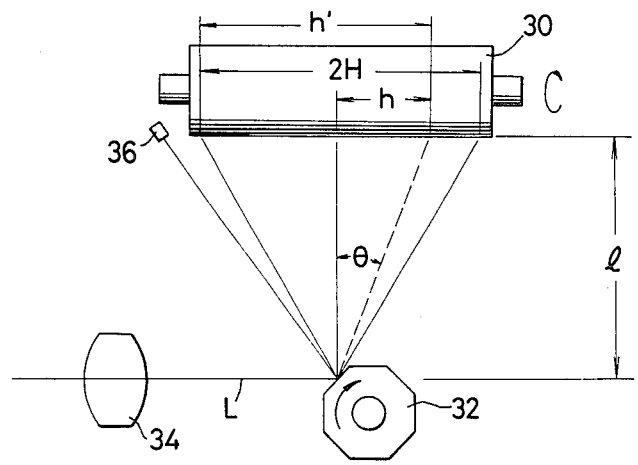
FIG. 3 is a plan view of an optical system in the optical scanning apparatus.

According to a first embodiment of the present invention, the time period from the generation of a synchronizing signal produced by the light sensor in the optical scanning apparatus (including the circuit of FIG. 1 and the optical system of FIG. 3) to the starting of varying the frequency of the image scanning clock signal is variable by a switch 40 (FIG. 14) connected to the control circuit 16. The signal EN applied by the control circuit 16 to the U/D counter 14 energizes the counter 14 upon elapse of a preset time Ta after the synchronizing signal has been received, and de-energizes the counter 14 upon elapse of a preset time Tb after the desired area or printing zone has been scanned. At the same time the counter 14 is de-energized, the frequency-dividing ratio N is fixed to the initial value.

Where a special polygonal mirror (as proposed in Japanese Patent Application No. 59(1984)-274324) in which the deflection angle $2\theta$ is given by $\sin\theta = (1-(A/R)\sin\alpha)$ where $\alpha$ is the angle of rotation of the mirro and A, R are constants relating to the shape of the polygonal mirror, is employed, the frequency $f_k(n)$ of the image scanning clock signal is varied according to the curve 4-1 shown in FIG. 4.

When the frequency-dividing ratio M of the second frequency divider was 8, the frequency $f_0$ of the reference clock signal was 20 MHz, the width $\Delta N$ for changing the frequency-dividing ratio N was 1, the number $2n_0$ of pixels in the scanning area was 2400, the number of elements of the finite sequence m was 7, and M1=5, M2=6, M3=10, M4=16, M5=10, M6=6, M7=5, n1=6, n2=9, n3=3, n4=5, n5=3, n6=9, n7=6, then a good recorded image substantially free from discontinuities and distortions was obtained. The frequency-dividing ratio N was 69 at the opposite ends of the printing zone and 89 at the center thereof. Variations between the pixels were ±1% or below.

Figure 5:
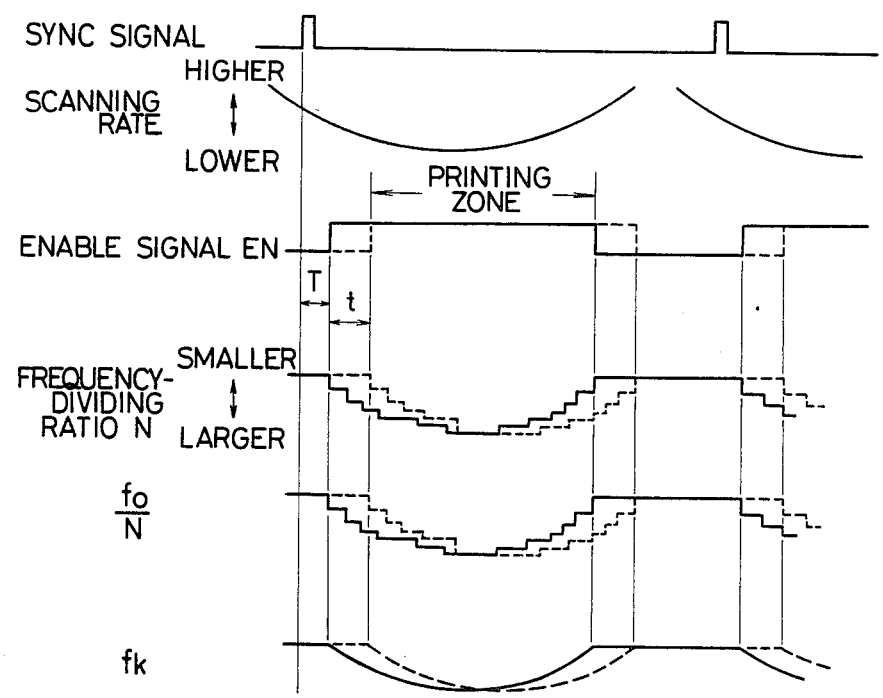
FIGS. 5 and 6 are timing charts of operation of an optical scanning apparatus according to an embodiment of the present invention.
Figure 6:
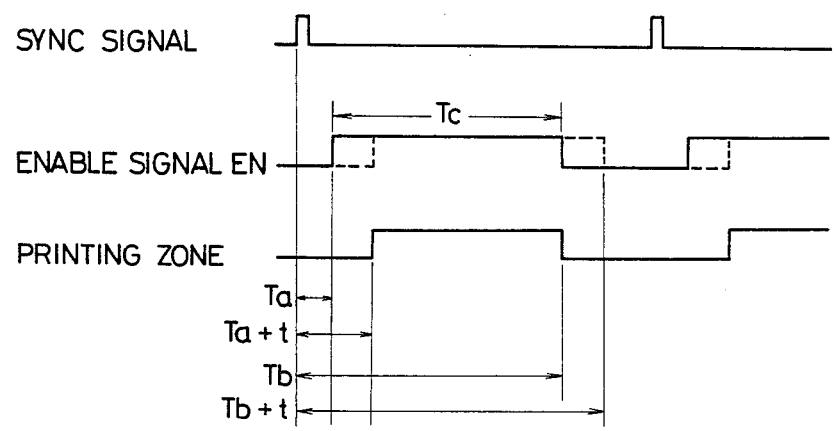
Figure 7:
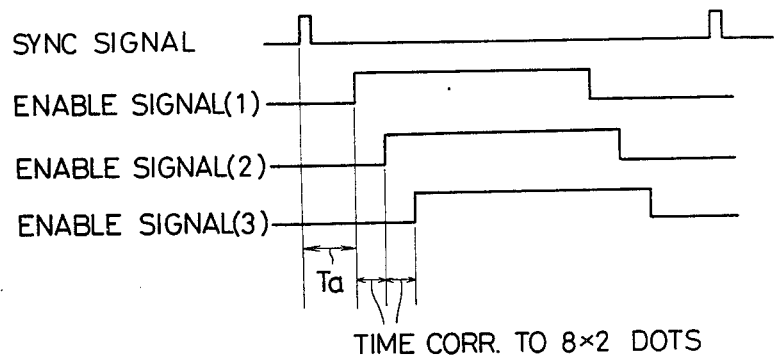
FIG. 7 is a timing chart explanatory of operation of the optical scanning apparatus of the invention.
Figure 8:
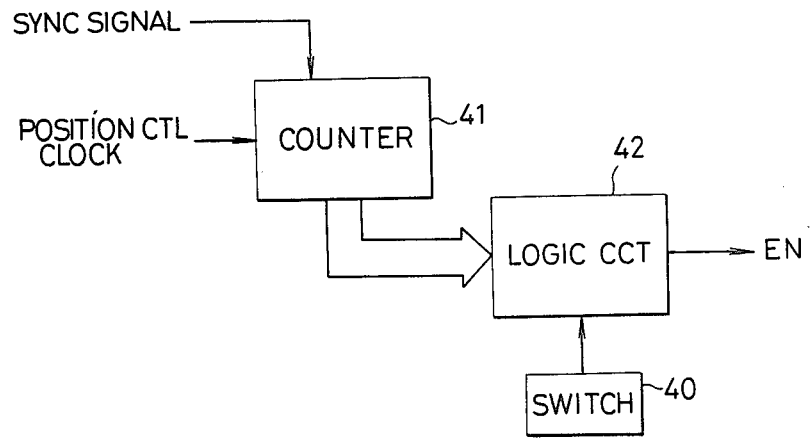
FIG. 8 is a block diagram of a portion of the optical scanning apparatus of the invention.

The switch 40 serves to select characteristics of correcting the frequency of the image scanning clock signal, and more specifically serves to select a step-like pattern indicative of changing frequency-dividing ratios of the frequency divider 12. The step-like pattern changes the frequency of the image scanning clock signal according to the speed at which the light beam is scanned, and is produced upon elapse of the time Ta after the generation of the synchronizing signal from the light sensor 36 and terminated after a time interval Tc, these time periods Ta, Tc being changed by the switch 40. The light beam L is modulated in a light modulator by an image signal fed from an external device in synchronism with the image scanning clock signal for forming an image on the photosensitive body 30. The time period during which the image is formed is within the time period during which the step-like pattern is generated. The step-like pattern is produced when the U/D counter 14 is started by the enable signal EN from the control circuit 16 to change the frequency-dividing ratio of the frequency divider 12. The control circuit 16 generates the enable signal EN from a counter 41 and a logic circuit 42 as shown in FIG. 8, and produces other signals CK, U/D in timed relation to the enable signal EN. The counter 41 is initialized by the synchronizing signal from the light sensor 36 for counting the position control pulses from the frequency divider 12. The logic circuit 42 generates the enable signal EN until the count of the counter 41 changes from a first value to a second value. The time at which the enable signal EN is generated is varied as shown in FIG. 7 through switching between the first and second values by means of the switch 40. A range t in which the enable signal EN is variable is given by:

$$t = (n-1) \times \Delta t$$

where n is the number of enable signals EN which can be switched by the switch 40, and $\Delta t$ is the time corresponding to $M \times \Delta n$ dots, M being the frequency-dividing ratio of the frequency divider 24. For example, if M=8, $\Delta n$=2, and n=3, then the range t becomes an interval equal to $t = 8 \times 2 \times (3-1) = 32$ dots. FIGS. 5 and 6 are timing charts of operation of the first embodiment.

Figure 10:
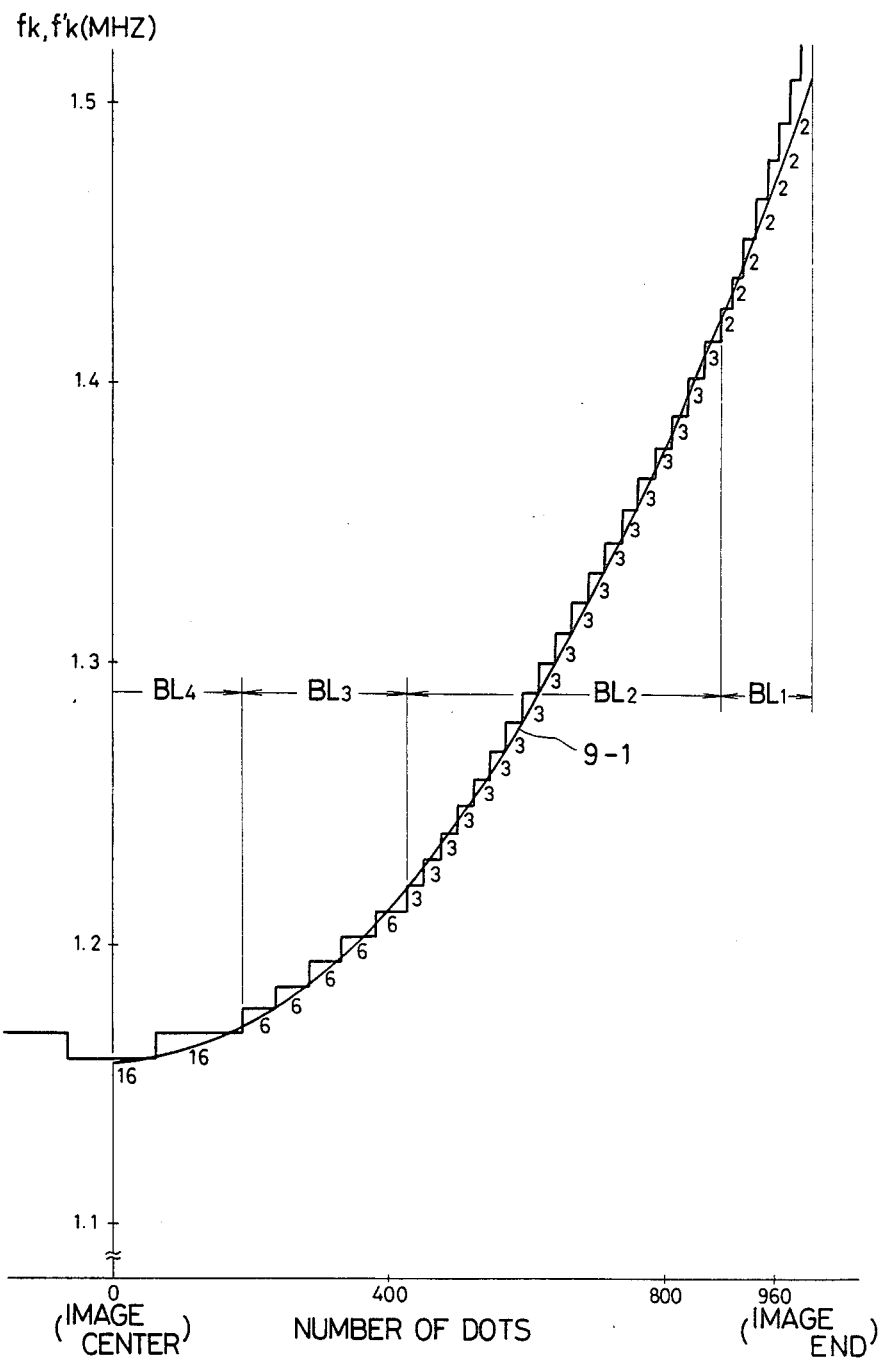
FIG. 10 is a graph showing the characteristics of the optical scanning apparatus of FIG. 9.
Figure 11:
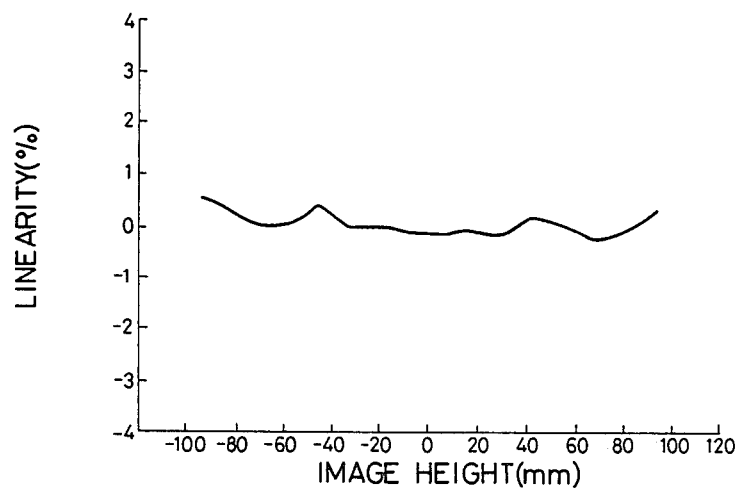

FIG. 9 illustrates an optical system according to a second embodiment which employs a polygonal mirror 45 (as disclosed in Japanese Patent Application No. 59(1984)-274324) in which the deflection angle $2\theta$ is given by $\sin\theta = 1 - (A/R)\sin\alpha$ and which has a curvature in the scanning direction, where $\alpha$ is the angle of rotation of the mirror, A is the radius of an inscribing circle, and R is a radius of curvature of the reflecting surfaces. A light beam emitted from a light source 43 travels through an image-forming lens 34, and is reflected by a mirror 44 and the polygonal mirror 45 to fall on the photosensitive body 30 and the light sensor 36. The other components of the second embodiment in the optical system shown in FIG. 9 are the same as those of the first embodiment. The frequence $fk(n)$ of the image scanning clock signal varies according to a curve 9-1 of FIG. 10. When the frequency-dividing ratio of the frequency divider 24 was 8, the frequency $f_0$ of the reference clock signal was 20 MHz, the width $\Delta N$ for changing the frequency-dividing ratio N was 1, the number $2n_0$ of pixels in the scanning area was 1968, the number of elements of the finite sequency m was 7, and M1=2, M2=3, M3=6, M4=16, M5=6, M6=3, M7=2, n1=8, n2=19, n3=5, n4=3, n5=5, n6=19, n7=8, then a good recorded image with linearity (rate of change of the actual pitch between vertical lines, the pitch being 12.7 mm as shown) of ±1% was obtained as shown in FIG. 11.

Figure 12:
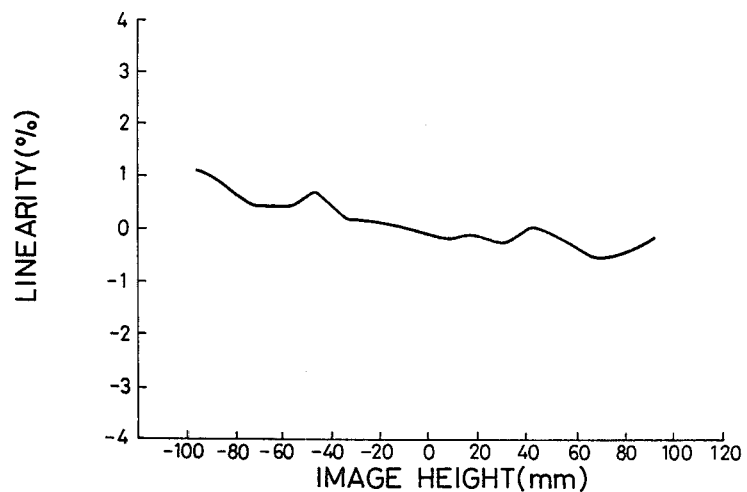

If the position in which the light beam is applied to the polygonal mirror were displaced 0.6 mm and the light sensor 36 were displaced 1 mm from the designed position, then the actual scanning speed and the corrected image scanning clock frequency would deviate from each other, and the linearity would be lowered as shown in FIG. 12 to the extent that it would be in excess of ±1% at the end of the image.

To eliminate the above drawback, the time to start correcting the image scanning clock frequency is delayed by the switch 40 by $\Delta n = 2$, i.e., $\Delta n \times M = 16$ dots, and as a result, the linearity is improved so as to be smaller than ±1% as illustrated in FIG. 13. The characteristics of correcting the image scanning clock frequency is selected at the factory by measuring the time period from the generation of the synchronizing signal to the time to start writing information, and also measuring deviation of the scanning speed characteristics from ideal characteristics.

According to a third embodiment, the circuit for generating a recording position signal in the first embodiment is composed of a counter 46 and a JK flip-flop 47 as shown in FIG. 15. The other components of the third embodiment are the same as those of the first embodiment.

The counter 46 is initialized (reset) by the synchronizing signal from the light sensor 36 to count the position control clock signal from the frequency divider 12. When the counter of the counter 46 reaches first and second values which substantially correspond respectively to the starting and terminal ends of a printing period (period in which a latent image is formed on the photosensitive body 30) during each scanning period, an output signal is applied from the counter 46 respectively to J, K terminals of the flip-flop 47. The flip-flop 47 is also supplied with the clock signal CLA from the frequency divider 24. Therefore, the flip-flop 47 is set by a positive-going edge (or a negative-going edge) of the clock signal CLA after the count of the counter 46 becomes the first value to thereby generate a recording position signal, and reset by a positive-going edge (or a negative-going edge) of the clock signal CLA after the count of the counter 46 becomes the second value. Thus, the recording position signal generated by the flip-flop 47 is in phase with the image scanning clock signal from the voltage-controlled oscillator 22. The recording position signal and the image scanning clock signal are supplied to the external device, which issues an image signal in synchronism with the image scanning clock signal when the recording position signal is applied. The light modulator modulates the light beam L with the image signal thus issued.

According to a fourth embodiment, the circuit for generating the recording position signal in the first embodiment is composed of a counter 46, a JK flip-flop 47, and a selector circuit 48 as shown in FIG. 16. The selector circuit 48 comprises an inverter 49 and a switch 50. The other components of the fourth embodiment are the same as those of the first embodiment.

The counter 46 is initialized (reset) by the synchronizing signal from the light sensor 36 to count the position control clock signal from the frequency divider 12. When the count of the counter 46 reaches first and second values which substantially correspond respectively to the starting and terminal ends of a printing period (period in which a latent image is formed on the photosensitive body 30) during each scanning period, an output signal is applied from the counter 46 respectively to J, K terminals of the flip-flop 47. The flip-flop 47 is also supplied with the clock signal CLA from the frequency divider 24 through the selector circuit 48. By shifting the movable contact of the switch 50 into contact with a fixed contact U, the clock signal CLA from the frequency divider 24 is applied directly to the flip-flop 47. Therefore, the flip-flop 47 is set by a positive-going edge of the clock signal CLA after the count of the counter 46 becomes the first value to thereby generate a recording position signal, and reset by a positive-going edge of the clock signal CLA after the count of the counter 46 becomes the second value. By shifting the movable contact of the switch 50 into contact with a fixed contact D, the clock signal CLA from the frequency divider 24 is inverted by the inverter 49 and the inverted clock signal is applied to the flip-flop 47. Therefore, the flip-flop 47 is reset by a positive-going edge of the clock signal CLA after the count of the counter 46 becomes the first value to thereby generate a recording position signal, and reset by a negative-going edge of the clock signal CLA after the count of the counter 46 becomes the second value. Consequently, whether the recording position signal is to be generated by a positive-going edge or a negative-going edge of the clock signal CLA can be selected by the switch 50. That is, the time at which the recording position signal is generated can be adjusted by the switch 50. The recording position signal and the image scanning clock signal are supplied to the external device, which issues an image signal in synchronism with the image scanning clock signal when the recording position signal is applied. The light modulator modulates the light beam L with the image signal thus issued.

Although certain preferred embodiments have been shown and described, it should be understood that many changes and modifications may be made therein without departing from the scope of the appended claims.

What is claimed is:
1. An optical scanning apparatus comprising:
a photosensitive body;
a light source for emitting a light beam;
a rotatable light deflector for deflecting the light beam from said light source to form a scanning beam and scan an area of said photosensitive body therewith;
a condenser lens disposed between said light source and said rotatable light deflector for focusing the light beam from said light source as a small light spot on said photosensitive body;
a light sensor for detecting the scanning light beam from said rotatable light deflector outside of said area of said photosensitive body and for generating a synchronizing signal in response to detecting the scanning beam; and
non-optical means for providing an image scanning clock signal whose frequency varies according to the speed at which the photosensitive body is scanned with the scanning light beam from said rotatable light deflector, upon elapse of a preset time period after a synchronizing signal has been generated by said light sensor; and
time varying means for varying said preset time period.

2. An optical scanning apparatus according to claim 1, including a source of a reference clock signal and means to derive a frequency-divided signal from said reference clock signal, wherein said time varying means comprises a counter resettable by the synchronizing signal from said light sensor for counting said frequency-divided signal derived from said reference clock signal, a logic circuit for generating an enable signal to correct the frequency of said image scanning clock signal when the count of said counter is in a preset range, and a switch for varying said preset range.

3. An optical scanning apparatus comprising:
a rotatable light deflector for deflecting a light beam to scan an area;
an oscillator light deflector for deflecting a light beam to scan an area;
an oscillator for generating a reference clock signal;
a frequency divider for frequency-dividing said reference clock signal to generate a position control clock signal;
means for generating an image scanning clock signal from said position control clock signal;
control means for successively changing the frequency dividing ratio of said frequency divider to vary the frequency of said image scanning clock signal according to the speed at which said area is scanned with said light beam;
a light sensor for detecting the scanning light beam from said rotatable light deflector outside of said area and for generating a synchronizing signal;
a counter resettable by said synchronizing signal from said light sensor for counting said position control clock signal; and
means for generating a recording position signal when the count of said counter is in a preset range.

4. An optical scanning apparatus according to claim 3, wherein said means for generating an image scanning clock signal comprises a phase-locked loop.

5. An optical scanning apparatus according to claim 3, including means for deriving a frequency-divided signal from said image scanning clock signal, wherein said means for generating a recording position signal comprises a flip-flop which is toggled by said frequency-divided signal derived from said image scanning clock signal when the count of said counter is of first and second values.

6. An optical scanning apparatus according to claim 5, including selector means for selecting whether said flip-flop is to be toggled by a positive-going edge or a negative-going edge of said frequency-divided signal derived from said image scanning clock signal.

7. An optical scanning apparatus according to claim 6, wherein said selector means comprises means for selecting whether said frequency-divided signal is to be delivered directly to said flip-flop or inverted and then delivered to said flip-flop.

8. Apparatus comprising:
a surface;
an optical system generating a scanning beam which impinges on the surface at an angle which varies with time and scans a line of uniformly sized pixels therealong at a speed which varies with the angle;
an electronic, non-optical pixel timing circuit which generates pixel timing signals at a frequency which varies with the position of the beam along the scan line;
a detector which is at a fixed position relative to the surface, receives the scanning beam when the beam is at a position in which it does not impinge on the scan line, and generates a synchronizing signal in response to receiving the beam;
a control coupled to said detector and to said pixel timing circuit to cause said circuit to commence generating said pixel timing signals at a starting time which is spaced from the synchronizing signal generated by the detector by a selectable interval.

9. Apparatus as in claim 8 in which the control comprises a counter which commences counting in response to the synchronizing signal and a logic circuit for causing said pixel timing circuit to commence generating said pixel timing signals when the count in the counter is at a first selectable level.

10. Apparatus as in claim 9 in which the range of said selectable interval is sufficiently wide to allow it to accommodate manufacturing tolerances in the relative positions of said detector and said scan line position on said surface.

11. An optical scanning apparatus comprising:
a photosensitive body;
a light source for emitting a light beam;
a rotatable light deflector for deflecting the light beam from said light source to form a scanning beam and scan an area of said photosensitive body therewith;
a condenser lens disposed between said light source and said rotatable light deflector for focusing the light beam from said light source as a small light spot on said photosensitive body;
a light sensor for detecting the scanning light beam from said rotatable light deflector outside of said area of said photosensitive body and for generating a synchronizing signal in response to detecting the scanning beam;
means for providing an image scanning clock signal whose frequency varies according to the speed at which the photosensitive body is scanned with the scanning light beam from said rotatable light deflector, upon elapse of a preset time period after a synchronizing signal has been generated by said light sensor;
wherein said varying frequency has its peak at the center of the photosensitive body, changes symmetrically therefrom, and is the lowest at both ends of the photosensitive body; and
time varying means for varying said preset time period.

12. An optical scanning apparatus comprising:
a photosensitive body;
a light source for emitting a light beam;
a rotatable light deflector for deflecting the light beam from said light source to form a scanning beam and scan an area of said photosensitive body therewith;
a condenser lens disposed between said light source and said rotatable light deflector for focusing the light beam from said light source as a small light spot on said photosensitive body;
a light sensor for detecting the scanning light beam from said rotatable light deflector outside of said area of said photosensitive body and for generating a synchronizing signal in response to detecting the scanning beam;
means for providing an image scanning clock signal whose frequency varies according to the speed at which the photosensitive body is scanned with the scanning light beam from said rotatable light deflector, upon elapse of a preset time period after a synchronizing signal has been generated by said light sensor;
wherein said means for providing an image scanning clock signal comprises an oscillator operating at a selected frequency and means for dividing the oscillator frequency by a varying divisor to thereby generate said clock signal whose frequency varies according to said scanning speed; and
time varying means for varying said preset time period.

13. An optical scanning apparatus comprising:
a rotary photosensitive body;
a light source for emitting a light beam;
a rotatable light deflector for deflecting the light beam from said light source to form a scanning beam and scan an area of said photosenstive body therewith;
a condenser lens disposed between said light source and said rotatable light deflector for focusing the light beam from said light source as a small light spot on said photosensitive body;
a light sensor for detecting the scanning light beam from said rotatable light deflector outside of said area of said photosensitive body and for generating a synchronizing signal in response to detecting the scanning beam;
means for providing an image scanning clock signal whose frequency varies according to the speed at which the photosensitive body is scanned with the scanning light beam from said rotatable light deflector, upon elapse of a preset time period after a synchronizing signal has been generated by said light sensor;
wherein said frequency changes with the rotary position of said photosensitive body; and
time varying means for varying said preset time period.

* * * * *